(12) United States Patent
Quint et al.

(10) Patent No.: US 8,092,634 B2
(45) Date of Patent: *Jan. 10, 2012

(54) METHOD FOR CONNECTING A CATHETER BALLOON WITH A CATHETER SHAFT OF A BALLOON CATHETER

(75) Inventors: Bodo Quint, Rottenburg-Seebronn (DE); Stevan Nielsen, Rottenburg (DE)

(73) Assignee: Abbott Laboratories Vascular Enterprises Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/871,440

(22) Filed: Aug. 30, 2010

(65) Prior Publication Data

US 2010/0319848 A1    Dec. 23, 2010

Related U.S. Application Data

(63) Continuation of application No. 10/952,543, filed on Sep. 29, 2004, now Pat. No. 7,785,439.

(51) Int. Cl.
*B32B 37/00* (2006.01)
(52) U.S. Cl. ............... 156/293; 156/272.2; 156/273.5
(58) Field of Classification Search ............... 156/293, 156/272.2, 273.5
See application file for complete search history.

(56) References Cited

U.S. PATENT DOCUMENTS

| | | |
|---|---|---|
| 3,528,867 A | 9/1970 | Leatherman et al. |
| 4,251,305 A | 2/1981 | Becker et al. |
| 4,490,421 A | 12/1984 | Levy |
| 4,563,181 A | 1/1986 | Wijayarathna et al. |
| 4,721,115 A | 1/1988 | Owens |
| 4,748,982 A | 6/1988 | Horzewski et al. |
| 4,762,129 A | 8/1988 | Bonzel |
| 4,771,777 A | 9/1988 | Horzewski et al. |
| RE32,983 E | 7/1989 | Levy |
| 4,877,031 A | 10/1989 | Conway et al. |
| 4,892,519 A | 1/1990 | Songer et al. |
| 4,898,591 A | 2/1990 | Jang et al. |
| 4,921,483 A | 5/1990 | Wijay et al. |
| 4,944,745 A | 7/1990 | Sogard et al. |
| 4,978,835 A | 12/1990 | Luijtjes et al. |
| RE33,561 E | 3/1991 | Levy |
| 5,037,404 A | 8/1991 | Gold et al. |

(Continued)

FOREIGN PATENT DOCUMENTS

DE    19729499    1/1999

(Continued)

OTHER PUBLICATIONS

U.S. Appl. No. 60/575,643, filed May 27, 2004, Von Oepen.

(Continued)

*Primary Examiner* — Jeff Aftergut
(74) *Attorney, Agent, or Firm* — Workman Nydegger

(57) ABSTRACT

A method for connecting a catheter balloon with a catheter shaft of a balloon catheter that improves the welding quality of a weld between the catheter balloon and the catheter shaft of the balloon catheter. Preferably, a welding energy absorbing device is arranged, preferably in the form of a coloured tubing, in the area of a fixation site after attaching a pre-fixation and then to irradiate this welding energy absorbing device with the radiation energy to carry out the welding. After the welding the pre-fixation and the welding energy absorbing device are removed.

8 Claims, 1 Drawing Sheet

U.S. PATENT DOCUMENTS

| | | | |
|---|---|---|---|
| 5,047,045 A | 9/1991 | Arney et al. |
| 5,078,702 A | 1/1992 | Pomeranz |
| 5,102,403 A | 4/1992 | Alt |
| 5,135,535 A | 8/1992 | Kramer |
| 5,147,317 A | 9/1992 | Shank et al. |
| 5,154,725 A | 10/1992 | Leopold |
| 5,195,978 A | 3/1993 | Schiffer |
| 5,217,482 A | 6/1993 | Keith |
| 5,221,270 A | 6/1993 | Parker |
| 5,226,888 A | 7/1993 | Arney |
| 5,252,159 A | 10/1993 | Arney |
| 5,261,879 A | 11/1993 | Brill |
| 5,267,958 A | 12/1993 | Buchbinder et al. |
| 5,300,025 A | 4/1994 | Wantink |
| 5,304,198 A | 4/1994 | Samson |
| 5,328,468 A | 7/1994 | Kaneko et al. |
| 5,334,147 A | 8/1994 | Johnson |
| 5,357,978 A | 10/1994 | Turk |
| 5,370,615 A | 12/1994 | Johnson |
| 5,395,334 A | 3/1995 | Keith et al. |
| 5,410,797 A | 5/1995 | Steinke et al. |
| 5,413,557 A | 5/1995 | Solar |
| 5,413,560 A | 5/1995 | Solar |
| 5,425,711 A | 6/1995 | Ressemann et al. |
| 5,443,457 A | 8/1995 | Ginn et al. |
| 5,460,185 A | 10/1995 | Johnson et al. |
| 5,470,315 A | 11/1995 | Adams |
| 5,480,383 A | 1/1996 | Bagaoisan et al. |
| 5,489,271 A | 2/1996 | Andersen |
| 5,490,837 A | 2/1996 | Blaeser et al. |
| 5,496,346 A | 3/1996 | Horzewski et al. |
| 5,500,180 A | 3/1996 | Anderson et al. |
| 5,501,759 A | 3/1996 | Forman |
| 5,538,510 A | 7/1996 | Fontirroche et al. |
| 5,545,138 A | 8/1996 | Fugoso et al. |
| 5,545,200 A | 8/1996 | West et al. |
| 5,549,552 A | 8/1996 | Peters et al. |
| 5,549,553 A | 8/1996 | Ressemann et al. |
| 5,549,563 A | 8/1996 | Kronner |
| 5,588,964 A | 12/1996 | Imran et al. |
| 5,605,543 A | 2/1997 | Swanson |
| 5,634,902 A | 6/1997 | Johnson et al. |
| 5,649,909 A | 7/1997 | Cornelius |
| 5,656,029 A | 8/1997 | Imran et al. |
| 5,658,251 A | 8/1997 | Ressemann et al. |
| 5,662,622 A | 9/1997 | Gore et al. |
| 5,667,493 A | 9/1997 | Janacek |
| 5,669,932 A | 9/1997 | Fischell et al. |
| 5,695,483 A | 12/1997 | Samson |
| 5,702,439 A | 12/1997 | Keith et al. |
| 5,711,909 A | 1/1998 | Gore et al. |
| 5,728,067 A | 3/1998 | Enger |
| 5,733,400 A | 3/1998 | Gore et al. |
| 5,738,667 A | 4/1998 | Solar |
| 5,743,875 A | 4/1998 | Sirhan et al. |
| 5,755,685 A | 5/1998 | Andersen |
| 5,755,687 A | 5/1998 | Donlon |
| 5,772,669 A | 6/1998 | Vrba |
| 5,775,685 A | 7/1998 | Yamaoka et al. |
| 5,807,355 A | 9/1998 | Ramzipoor et al. |
| 5,820,594 A | 10/1998 | Fontirroche et al. |
| 5,820,613 A | 10/1998 | Van Werven-Franssen et al. |
| 5,823,995 A | 10/1998 | Fitzmaurice et al. |
| 5,824,173 A | 10/1998 | Fontirroche et al. |
| 5,833,604 A | 11/1998 | Houser et al. |
| 5,836,965 A | 11/1998 | Jendersee et al. |
| 5,843,032 A | 12/1998 | Kastenhofer |
| 5,843,050 A | 12/1998 | Jones et al. |
| 5,851,464 A | 12/1998 | Davila et al. |
| 5,882,336 A | 3/1999 | Janacek |
| 5,891,056 A | 4/1999 | Ramzipoor |
| 5,891,110 A | 4/1999 | Larson et al. |
| 5,902,290 A | 5/1999 | Peacock, III et al. |
| 5,906,619 A | 5/1999 | Olson et al. |
| 5,938,645 A | 8/1999 | Gordon |
| 5,951,539 A | 9/1999 | Nita et al. |
| 5,980,486 A | 11/1999 | Enger |
| 6,004,291 A | 12/1999 | Ressemann et al. |
| 6,010,521 A | 1/2000 | Lee et al. |
| 6,017,323 A | 1/2000 | Chee |
| 6,027,477 A | 2/2000 | Kastenhofer |
| 6,030,405 A | 2/2000 | Zarbatany et al. |
| 6,036,670 A | 3/2000 | Wijeratne et al. |
| 6,036,715 A | 3/2000 | Yock |
| 6,059,770 A | 5/2000 | Peacock, III et al. |
| 6,066,114 A | 5/2000 | Goodin et al. |
| 6,071,273 A | 6/2000 | Euteneuer et al. |
| 6,102,890 A | 8/2000 | Stivland et al. |
| 6,123,698 A | 9/2000 | Spears et al. |
| 6,129,708 A | 10/2000 | Enger |
| 6,152,909 A | 11/2000 | Bagaoisan et al. |
| 6,159,229 A | 12/2000 | Jendersee et al. |
| 6,165,166 A | 12/2000 | Samuelson et al. |
| 6,187,130 B1 | 2/2001 | Berard et al. |
| 6,193,686 B1 | 2/2001 | Estrada et al. |
| 6,210,364 B1 | 4/2001 | Anderson et al. |
| 6,254,549 B1 | 7/2001 | Ramzipoor |
| 6,273,874 B1 | 8/2001 | Parris |
| 6,273,899 B1 | 8/2001 | Kramer |
| 6,283,939 B1 | 9/2001 | Anderson et al. |
| 6,306,105 B1 | 10/2001 | Rooney et al. |
| 6,306,124 B1 | 10/2001 | Jones et al. |
| 6,309,402 B1 | 10/2001 | Jendersee et al. |
| 6,319,244 B2 | 11/2001 | Suresh et al. |
| 6,344,029 B1 | 2/2002 | Estrada et al. |
| 6,361,529 B1 | 3/2002 | Goodin et al. |
| 6,368,302 B1 | 4/2002 | Fitzmaurice et al. |
| 6,375,899 B1 | 4/2002 | Ackley et al. |
| 6,402,720 B1 | 6/2002 | Miller et al. |
| 6,425,898 B1 | 7/2002 | Wilson et al. |
| 6,475,184 B1 | 11/2002 | Wang et al. |
| 6,475,209 B1 | 11/2002 | Larson et al. |
| 6,488,694 B1 | 12/2002 | Lau et al. |
| 6,527,789 B1 | 3/2003 | Lau et al. |
| 6,530,938 B1 | 3/2003 | Lee et al. |
| 6,565,588 B1 | 5/2003 | Clement et al. |
| 6,575,958 B1 | 6/2003 | Happ et al. |
| 6,575,993 B1 | 6/2003 | Yock |
| 6,579,278 B1 | 6/2003 | Bencini |
| 6,633,648 B1 | 10/2003 | Bauck |
| 6,648,854 B1 | 11/2003 | Patterson et al. |
| 6,652,507 B2 | 11/2003 | Pepin |
| 6,663,648 B1 | 12/2003 | Trotta |
| 6,685,720 B1 | 2/2004 | Wu et al. |
| 6,685,721 B1 | 2/2004 | Kramer |
| 6,692,460 B1 | 2/2004 | Jayaraman |
| 6,695,812 B2 | 2/2004 | Estrada et al. |
| 6,702,750 B2 | 3/2004 | Yock |
| 6,702,781 B1 | 3/2004 | Reifart et al. |
| 6,733,473 B1 | 5/2004 | Reifart et al. |
| 6,733,487 B2 | 5/2004 | Keith et al. |
| 6,770,038 B2 | 8/2004 | Balbierz et al. |
| 6,814,744 B2 | 11/2004 | Yang et al. |
| 6,818,001 B2 | 11/2004 | Wulfman et al. |
| 6,821,281 B2 | 11/2004 | Sherman et al. |
| 6,821,287 B1 | 11/2004 | Jang |
| 6,887,219 B2 | 5/2005 | Wantink |
| 6,893,417 B2 | 5/2005 | Gribbons et al. |
| 6,979,342 B2 | 12/2005 | Lee et al. |
| 7,001,358 B2 | 2/2006 | Fitzmaurice et al. |
| 7,025,258 B2 | 4/2006 | Chang |
| 7,037,291 B2 | 5/2006 | Lee et al. |
| 7,118,551 B1 | 10/2006 | Lee et al. |
| 7,309,334 B2 | 12/2007 | von Hoffmann |
| 7,445,684 B2 | 11/2008 | Pursley |
| 7,527,606 B2 | 5/2009 | Oepen |
| 7,785,439 B2 * | 8/2010 | Quint et al. ............. 156/293 |
| 2001/0021840 A1 | 9/2001 | Suresh et al. |
| 2001/0034514 A1 | 10/2001 | Parker |
| 2002/0007146 A1 | 1/2002 | Omaleki et al. |
| 2002/0115963 A1 | 8/2002 | Clarke et al. |
| 2003/0105427 A1 | 6/2003 | Lee et al. |
| 2003/0163082 A1 | 8/2003 | Mertens |
| 2004/0010243 A1 | 1/2004 | Klint |
| 2004/0059292 A1 | 3/2004 | Hisamatsu et al. |
| 2004/0193140 A1 | 9/2004 | Griffin et al. |
| 2004/0236367 A1 | 11/2004 | Brown et al. |

| | | | |
|---|---|---|---|
| 2005/0267408 | A1 | 12/2005 | Grandt et al. |
| 2006/0071371 | A1 | 4/2006 | Quint et al. |
| 2006/0270977 | A1 | 11/2006 | Fisher et al. |
| 2007/0016132 | A1 | 1/2007 | Oepen et al. |
| 2007/0016165 | A1 | 1/2007 | Von Oepen et al. |
| 2007/0021771 | A1 | 1/2007 | Oepen et al. |
| 2007/0060910 | A1 | 3/2007 | Grandt et al. |
| 2007/0078439 | A1 | 4/2007 | Grandt et al. |
| 2007/0083188 | A1 | 4/2007 | Grandt et al. |
| 2007/0167913 | A1 | 7/2007 | Elkins et al. |
| 2009/0018502 | A1 | 1/2009 | Reifart et al. |

FOREIGN PATENT DOCUMENTS

| | | |
|---|---|---|
| EP | 0029185 | 5/1981 |
| EP | 0408198 | 1/1991 |
| EP | 0414350 | 2/1991 |
| EP | 0518205 | 12/1992 |
| EP | 0806220 | 11/1997 |
| EP | 0916359 | 5/1999 |
| EP | 1234595 | 8/2002 |
| EP | 1435252 | 7/2004 |
| EP | 1518581 | 3/2005 |
| WO | WO 92/17236 | 10/1992 |
| WO | WO 98/56448 | 12/1998 |
| WO | WO 01/70321 | 9/2001 |
| WO | WO 2005/113047 | 12/2005 |
| WO | WO 2005/118044 | 12/2005 |
| WO | WO 2005/118045 | 12/2005 |
| WO | WO 2006/104591 | 10/2006 |
| WO | WO 2006/127929 | 11/2006 |
| WO | WO 2006/127931 | 11/2006 |

OTHER PUBLICATIONS

U.S. Appl. No. 60/654,022, filed Feb. 17, 2005, Grandt et al.
U.S. Appl. No. 60/684,135, filed May 23, 2005, Von Oepen.
U.S. Appl. No. 60/684,143, filed May 23, 2005, Von Oepen.
U.S. Appl. No. 60/742,059, filed Dec. 1, 2005, Grandt.
dictionary.com definition of dissipate, p. 1 (No Publication Date provided by Examiner).
U.S. Appl. No. 10/952,543, filed Feb. 8, 2007, Office Action.
U.S. Appl. No. 10/952,543, filed Jul. 12, 2007, Office Action.
U.S. Appl. No. 10/952,543, filed Nov. 27, 2007, Office Action.
U.S. Appl. No. 10/952,543, filed Feb. 12, 2008, Office Action.
U.S. Appl. No. 10/952,543, filed Jun. 9, 2008, Office Action.
U.S. Appl. No. 10/952,543, filed Feb. 6, 2009, Notice of Allowance.
U.S. Appl. No. 10/952,543, filed May 29, 2009, Notice of Allowance.
U.S. Appl. No. 10/952,543, filed Apr. 23, 2010, Notice of Allowance.
U.S. Appl. No. 11/136,251, filed Mar. 17, 2008, Office Action.
U.S. Appl. No. 11/136,251, filed Jun. 2, 2008, Office Action.
U.S. Appl. No. 11/136,251, filed Jan. 13, 2009, Notice of Allowance.
U.S. Appl. No. 11/136,251, filed Apr. 15, 2009, Issue Notification.
U.S. Appl. No. 11/357,775, filed Nov. 3, 2008, Office Action.
U.S. Appl. No. 11/357,775, filed May 18, 2009, Office Action.
U.S. Appl. No. 11/357,775, filed Sep. 23, 2009, Notice of Allowance.
U.S. Appl. No. 11/357,775, filed Oct. 29, 2009, Notice of Allowance.
U.S. Appl. No. 11/357,775, filed Nov. 18, 2009, Issue Notification.
U.S. Appl. No. 11/439,809, filed Jul. 29, 2008, Office Action.
U.S. Appl. No. 11/439,809, filed Sep. 3, 2008, Office Action.
U.S. Appl. No. 11/439,592, filed Nov. 4, 2008, Office Action.
U.S. Appl. No. 11/439,592, filed May 19, 2009, Office Action.
U.S. Appl. No. 11/439,592, filed Sep. 23, 2009, Notice of Allowance.
U.S. Appl. No. 11/439,592, filed Jan. 20, 2010, Issue Notification.
U.S. Appl. No. 11/439,591, filed Nov. 14, 2008, Office Action.
U.S. Appl. No. 11/439,591, filed Jul. 24, 2009, Office Action.
U.S. Appl. No. 11/439,591, filed Mar. 11, 2010, Notice of Allowance.
U.S. Appl. No. 11/136,640, filed Mar. 13, 2008, Office Action.
U.S. Appl. No. 11/136,640, filed Jun. 2, 2008, Office Action.
U.S. Appl. No. 11/136,640, filed Jan. 12, 2009, Notice of Allowance.
U.S. Appl. No. 11/136,640, filed Jun. 8, 2009, Notice of Allowance.
U.S. Appl. No. 11/136,640, filed Nov. 11, 2009, Issue Notification.
U.S. Appl. No. 11/439,810, filed Sep. 21, 2009, Office Action.
U.S. Appl. No. 11/439,810, filed Mar. 11, 2010, Notice of Allowance.
U.S. Appl. No. 11/439,596, filed Sep. 18, 2009, Office Action.
U.S. Appl. No. 11/439,596, filed Mar. 11, 2010, Notice of Allowance.
U.S. Appl. No. 13/172,467, filed Jun. 29, 2011, Quint.

* cited by examiner

METHOD FOR CONNECTING A CATHETER BALLOON WITH A CATHETER SHAFT OF A BALLOON CATHETER

CROSS-REFERENCE TO RELATED APPLICATIONS

This application is a continuation of U.S. patent application Ser. No. 10/952,543, filed Sep. 29, 2004, now U.S. Pat. No. 7,785,439, and entitled "METHOD FOR CONNECTING A CATHETER BALLOON WITH A CATHETER SHAFT OF A BALLOON CATHETER", the disclosure of which is hereby incorporated by reference in its entirety.

BACKGROUND OF THE INVENTION

1. Field of the Invention

This invention generally relates to a method for connecting a catheter balloon with a catheter shaft of a balloon catheter.

2. Background Information

In a known method this connection is carried out by local welding, for example by means of laser welding. This local welding requires locating the light beam on the connection site. In order to do so, for carrying out the known method the machine has to be adjusted exactly or the welding site has to be positioned exactly, respectively. However, this adjustment is very complicated, prone to errors and often requires manual correction of the apparatus. In addition to that, laser welding involves the problem that the total technical effort is very high and that examinations carried out in the context of the invention have shown that poor uniformity of the weld is often the result. In addition to that, in this method the material must be adapted to the radiation source.

In view of the above, it will be apparent to those skilled in the art from this disclosure that there exists a need for an improved method for connecting a catheter balloon with a catheter shaft of a balloon catheter. This invention addresses this need in the art as well as other needs, which will become apparent to those skilled in the art from this disclosure.

SUMMARY OF THE INVENTION

It is thus the object of the present invention to provide a method for connecting a catheter balloon with a catheter shaft of a balloon catheter the technical effort of which is lower and the welding results of which are improved compared to prior art.

The foregoing object can basically be attained by performing a method comprising the following steps: arranging a catheter balloon on a catheter shaft; attaching a pre-fixation for temporary fastening of the balloon to a desired fixation site of the catheter shaft; arranging a welding energy absorbing device in the area of the fixation site of the catheter balloon on the catheter shaft; irradiating the welding energy absorbing device with radiation energy; and removing the pre-fixation and the welding energy absorbing device after welding the balloon with the catheter shaft.

One advantage of the method according to the invention is that any desired materials can be used for the catheter balloon and the catheter shaft or catheter tube, respectively, since an adaptation to the radiation source to be used can be carried out by the welding energy absorbing device. During assembly the welding energy absorbing device defines the exact position at which welding is carried out afterwards or energy is injected, respectively. Consequently, no complex machine adjustment has to be carried out, since the required localization of the light beam is achieved by this external welding energy absorbing device which can be arranged exactly in the area of the desired weld in the area of the fixation site. A higher degree of automation of the welding apparatus is thus possible, involving at the same time higher accuracy and thus higher quality of the weld.

In addition to this, a distinction can be made between energy injection and fixation or sealing, respectively, of the welding site in the given arrangement, which makes an intensive flow of material possible. A displacement of material during the welding process and/or an intensive mixture of material are thus possible.

Furthermore, another advantage is that the method according to the invention is independent of the energy source, so that a variety of different radiation sources can be used.

As a particularly simple pre-fixation a heat shrink tubing can be used, which is applied to the pre-fixation site and is capable of fixing and sealing the fastening portion to be welded with the catheter shaft.

There are also several embodiments of welding energy absorbing devices possible. A particularly simple embodiment is a coloured tubing which can be applied via the pre-fixation exactly to the site at which the welding between balloon catheter and catheter shaft is to be carried out. In a further embodiment the pre-fixation is already locally coloured and thus serves both as pre-fixation and welding energy absorbing device. In addition to this, a coloured marking on the pre-fixation, for example a marking with a felt-tip pencil (Edding), can serve as welding energy absorbing device.

An alternative is a stiletto which can be inserted into the catheter shaft. On the stiletto a coloured area can be attached which can be positioned exactly at the site where the welding is desired. In this case, the welding is carried out "from within".

As has been explained above, a variety of different radiation sources are possible, such as laser sources, monochromatic or polychromatic light sources or other electromagnetic radiation sources. In this context it is important to bear in mind that the welding substrate and the focussing device have to differ in their absorption behaviour to a high degree.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
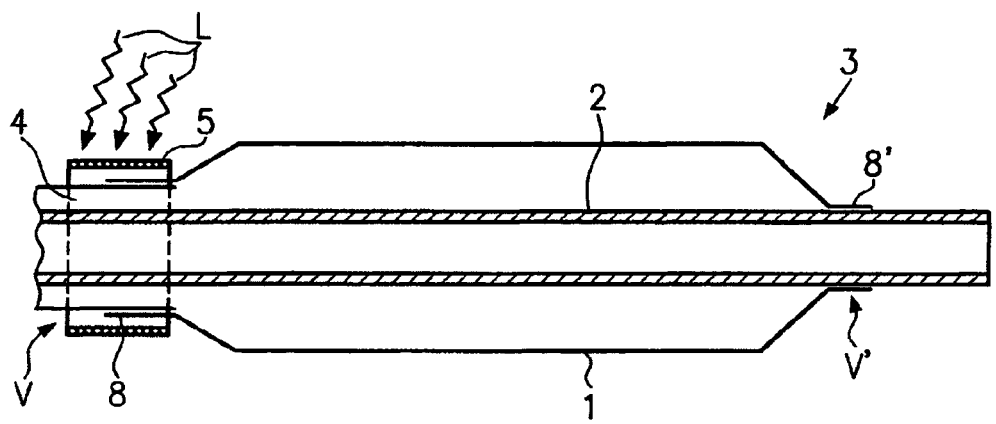
FIG. 1 is a schematically considerably simplified representation of a balloon catheter to explain a first embodiment of the inventive method.
Figure 2:
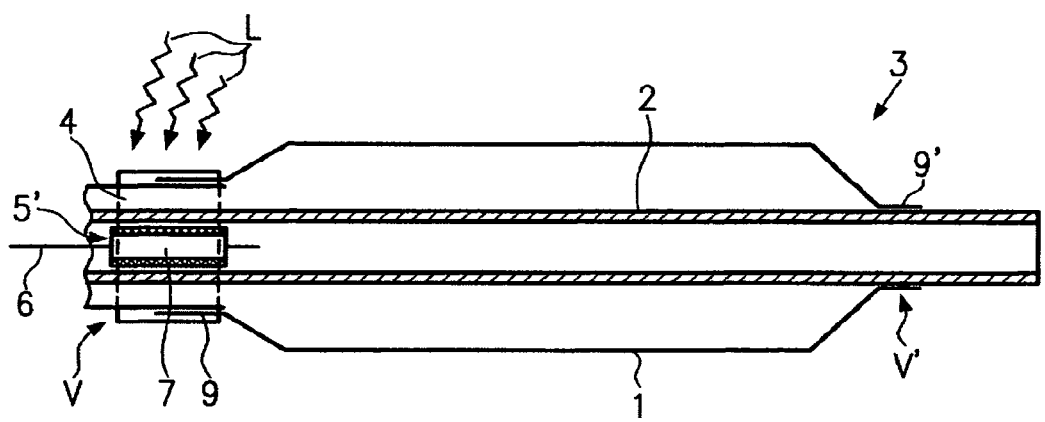
FIG. 2 is a representation of the balloon catheter corresponding to FIG. 1 to explain a second embodiment of the inventive method.

Referring to FIGS. 1 and 2, a proximal area of a balloon catheter 3 is illustrated in accordance with a first embodiment of the present invention. In this area a catheter balloon 1 is to be fastened on a catheter shaft 2 at two fixation sites V or V', respectively, via fastening portions 8 or 8', respectively. In order to explain the inventive method reference is made below to the schematically considerably simplified representation of the area of the fixation site V, the principles of which may also be used at the site V'.

In FIG. 1, an embodiment of the inventive method is shown, in which a pre-fixation 4, in this case in the form of a heat shrink tubing, is applied at the beginning, which fastens/connects the fastening portion 8 on the desired area of the catheter shaft 2. In the embodiment shown in FIG. 1, a coloured tubing 5 is then applied to the pre-fixation 4, which constitutes a welding energy absorbing device whose absorption is adapted to the light source whose course of beam is symbolised by the wavy arrow L.

After arrangement of the pre-fixation 4 and tubing 5, the fixation site V is irradiated with homogenous radiation. This results in welding of the fastening portion 8 of the catheter balloon 1 with the desired portion of the catheter tubing 2.

The advantage of this method is that the assembly of the welding energy absorbing device already defines the localization of the welding site. The welding is carried out in an automated manner in a homogenously excited area without precise requirements with regard to the position of weld metal. In doing so, the irradiated area can also be considerably larger than the welding site itself.

After the welding has been carried out both the welding energy absorbing device and the pre-fixation 4 are removed.

In FIG. 2, an alternative embodiment is shown in which in the area of the fixation site V a stiletto 6 having a coloured area 7 is inserted into the catheter shaft 2 on the distal side for welding with the fastening portion 9 of the catheter tubing 1 or with the fastening portion 9', respectively. In this embodiment the stiletto 6 and the coloured area 7 form the welding energy absorbing device 5'.

After pre-fixation, for example by means of a heat shrink tubing 4 according to the embodiment of FIG. 1, another irradiation with the help of the radiation source L can be carried out, so that the welding explained above in connection with the method according to FIG. 1 by injection of the radiation energy is achieved exactly in the area of the desired site of connection.

It should also be noted that the weld metal or the light source has to be turned during the welding process or the light source has to be ring-shaped. The pre-fixation or the heat shrink tubing, respectively, also serves as welding protection tube to ensure an even distribution of heat.

As has been explained above, a variety of different radiation sources are possible, such as laser sources, monochromatic or polychromatic light sources or other electromagnetic radiation sources. In this context it is important to bear in mind that the welding substrate and the focussing device have to differ in their absorption behaviour to a high degree.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application is based on European Patent Application No. 02029113.4-2310 filed on Dec. 31, 2002, and published on Jul. 7, 2004. The entire disclosure of European Patent Application No. 02029113.4-2310 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A method comprising the following steps:
    attaching a pre-fixation device for temporary fastening of a balloon to a desired fixation site of a catheter shaft;
    arranging a welding energy absorbing device separate from the pre-fixation device in the area of the fixation site of the catheter balloon on the catheter shaft;
    irradiating the welding energy absorbing device with radiation energy; and
    removing the pre-fixation device and the welding energy absorbing device after welding the balloon with the catheter shaft.

2. The method according to claim 1, wherein the pre-fixation device comprises a colored area.

3. The method according to claim 1, wherein the attaching of the pre-fixation device includes a heat shrink tubing being applied on the fixation site.

4. The method according to claim 1, wherein the welding energy absorbing device includes a colored area.

5. The method according to claim 1, wherein the arranging of the welding energy absorbing device includes a colored tubing being applied on the pre-fixation device.

6. The method according to claim 1, wherein arranging a welding energy absorbing device comprises positioning a stiletto having a colored area into the catheter shaft in the area of the desired fixation site as the welding energy absorbing device.

7. The method according to claim 1, wherein the irradiating of the welding energy absorbing device with radiation energy includes using one of a laser light, a monochromatic light or a polychromatic light as a light source or using an electromagnetic radiation source.

8. The method according to claim 1, wherein the radiation energy has an at least almost homogeneous distribution.

* * * * *